United States Patent
Ette

(10) Patent No.: US 10,730,478 B2
(45) Date of Patent: Aug. 4, 2020

(54) ACTUATION OF A LOCKING ELEMENT FOR A VEHICLE USING AN ULTRASOUND SENSOR

(71) Applicant: VOLKSWAGEN AKTIENGESELLSCHAFT, Wolfsburg (DE)

(72) Inventor: Bernd Ette, Wolfsburg (DE)

(73) Assignee: VOLKSWAGEN AKTIENGESELLSCHAFT (DE)

(*) Notice: Subject to any disclaimer, the term of this patent is extended or adjusted under 35 U.S.C. 154(b) by 123 days.

(21) Appl. No.: 15/565,731

(22) PCT Filed: Apr. 7, 2016

(86) PCT No.: PCT/EP2016/057642
§ 371 (c)(1),
(2) Date: Oct. 11, 2017

(87) PCT Pub. No.: WO2016/180582
PCT Pub. Date: Nov. 17, 2016

(65) Prior Publication Data
US 2018/0118161 A1    May 3, 2018

(30) Foreign Application Priority Data
May 8, 2015   (DE) .................. 10 2015 208 611

(51) Int. Cl.
*B60R 25/20*    (2013.01)
*G06F 3/01*     (2006.01)
(Continued)

(52) U.S. Cl.
CPC .......... *B60R 25/2054* (2013.01); *E05F 15/73* (2015.01); *E05F 15/76* (2015.01);
(Continued)

(58) Field of Classification Search
None
See application file for complete search history.

(56) References Cited

U.S. PATENT DOCUMENTS 7,420,876 B2 *   9/2008   Sugiura ................. G01S 15/025
                                                        367/87
8,091,280 B2 *   1/2012   Hanzel ................ B60R 25/2054
                                                        296/146.4
(Continued)

FOREIGN PATENT DOCUMENTS

CN   103858150 A   6/2014
CN   104276134 A   1/2015
(Continued)

OTHER PUBLICATIONS

Search Report for German Patent Application No. 10 2015 208 611.9, dated Apr. 6, 2016.
(Continued)

*Primary Examiner* — Steven Lim
*Assistant Examiner* — Muhammad Adnan

(57) ABSTRACT

A method to actuate a locking element for a vehicle including detecting a movement of an object using an optical sensor, activating an ultrasound sensor in accordance with the detected movement, detecting a gesture using the ultrasound sensor, and actuating the locking element in accordance with the detected gesture.

19 Claims, 3 Drawing Sheets

(51) Int. Cl.
  *E05F 15/73* (2015.01)
  *G06F 1/3231* (2019.01)
  *G01S 15/86* (2020.01)
  *E05F 15/76* (2015.01)
  *G01S 15/931* (2020.01)

(52) U.S. Cl.
  CPC ............ *G01S 15/86* (2020.01); *G01S 15/931* (2013.01); *G06F 1/3231* (2013.01); *G06F 3/011* (2013.01); *G06F 3/017* (2013.01); *B60R 25/2045* (2013.01); *E05F 2015/763* (2015.01); *E05F 2015/765* (2015.01); *E05F 2015/767* (2015.01); *E05Y 2400/858* (2013.01); *E05Y 2900/546* (2013.01); *G01S 2015/932* (2013.01)

(56) References Cited

U.S. PATENT DOCUMENTS

| | | | | |
|---|---|---|---|---|
| 9,377,860 | B1* | 6/2016 | Weber ................ | G06F 3/017 |
| 9,383,895 | B1* | 7/2016 | Vinayak .............. | G06F 3/017 |
| 9,580,046 | B2* | 2/2017 | Luu ..................... | E05F 15/73 |
| 9,598,049 | B2* | 3/2017 | Sherony .............. | G07C 9/00087 |
| 9,689,982 | B2* | 6/2017 | Herthan .............. | E05B 83/16 |
| 10,053,903 | B2* | 8/2018 | Ette .................... | E05F 15/73 |
| 2008/0266052 | A1* | 10/2008 | Schmid ............... | G01S 7/52004 |
| | | | | 340/5.1 |
| 2008/0296926 | A1* | 12/2008 | Hanzel ............... | B60R 25/2054 |
| | | | | 296/146.1 |
| 2010/0214112 | A1* | 8/2010 | Ishihara .............. | B60R 25/246 |
| | | | | 340/686.1 |
| 2010/0256875 | A1 | 10/2010 | Gehin | |
| 2011/0043325 | A1* | 2/2011 | Newman .............. | E05F 15/73 |
| | | | | 340/5.2 |
| 2012/0268364 | A1* | 10/2012 | Minnen ............... | G06K 9/00375 |
| | | | | 345/156 |
| 2013/0200995 | A1* | 8/2013 | Muramatsu ......... | B60R 25/24 |
| | | | | 340/5.51 |
| 2015/0009062 | A1* | 1/2015 | Herthan .............. | E05B 83/16 |
| | | | | 342/70 |
| 2015/0012176 | A1* | 1/2015 | Schindler ............ | B60W 50/08 |
| | | | | 701/36 |
| 2015/0258962 | A1* | 9/2015 | Khanu ................ | B60R 25/2054 |
| | | | | 701/49 |
| 2015/0262436 | A1* | 9/2015 | Herthan .............. | B60R 25/2054 |
| | | | | 340/5.72 |
| 2015/0291126 | A1* | 10/2015 | Nicholls ............. | E05F 15/73 |
| | | | | 701/49 |
| 2016/0012654 | A1* | 1/2016 | Sherony .............. | G07C 9/00087 |
| | | | | 340/5.61 |
| 2016/0061619 | A1* | 3/2016 | Kishore .............. | G01C 21/3602 |
| | | | | 701/400 |
| 2016/0357262 | A1* | 12/2016 | Ansari ................. | G06F 3/017 |
| 2017/0166167 | A1* | 6/2017 | Heller ................. | B60R 25/24 |
| 2017/0169641 | A1* | 6/2017 | Ziegler ............... | B60R 25/10 |

FOREIGN PATENT DOCUMENTS

| | | | | |
|---|---|---|---|---|
| CN | 104583027 | A | 4/2015 | |
| DE | 102004027457 | A1 | 12/2005 | |
| DE | 102008025669 | A1 | 12/2008 | |
| DE | 102009023594 | A1 | 12/2010 | |
| DE | 102009040395 | A1 | 4/2011 | |
| DE | 202010003763 | U1* | 7/2011 | ............ G60R 25/00 |
| DE | 202010017197 | U1 | 8/2011 | |
| DE | 102010060364 | A1 | 5/2012 | |
| DE | 102011087347 | A1 | 5/2013 | |
| DE | 102012017393 | A1 | 3/2014 | |
| DE | 102012107288 | A1 | 3/2014 | |
| DE | 102012022321 | A1 | 5/2014 | |
| DE | 102013110296 | A1 | 1/2015 | |
| FR | 2936545 | A1 | 4/2010 | |
| GB | 2498833 | A * | 7/2013 | ............ G01S 15/50 |
| GB | 2498833 | A | 7/2013 | |
| JP | 2015014119 | A | 1/2015 | |
| KR | 20130053967 | A * | 5/2013 | |
| WO | 2006024399 | A1 | 3/2006 | |
| WO | 2009000861 | A1 | 12/2008 | |
| WO | 2014086763 | A1 | 6/2014 | |

OTHER PUBLICATIONS

Search Report for International Patent Application No. PCT/EP2016/057642, dated Jul. 18, 2016.

Office Action for Chinese Patent Application No. 201680026741.4; dated Mar. 1, 2019.

* cited by examiner

ACTUATION OF A LOCKING ELEMENT FOR A VEHICLE USING AN ULTRASOUND SENSOR

PRIORITY CLAIM

This patent application is a U.S. National Phase of International Patent Application No. PCT/EP2016/057642, filed 7 Apr. 2016, which claims priority to German Patent Application No. 10 2015 208 611.9, filed 8 May 2015, the disclosures of which are incorporated herein by reference in their entireties.

SUMMARY

Illustrative embodiments relate to the actuation of a closing element, in particular, a tailgate, of a vehicle using an ultrasound sensor.

BRIEF DESCRIPTION OF THE DRAWINGS

The disclosed embodiments are described in detail below with reference to the figures.

DETAILED DESCRIPTION

Figure 1:
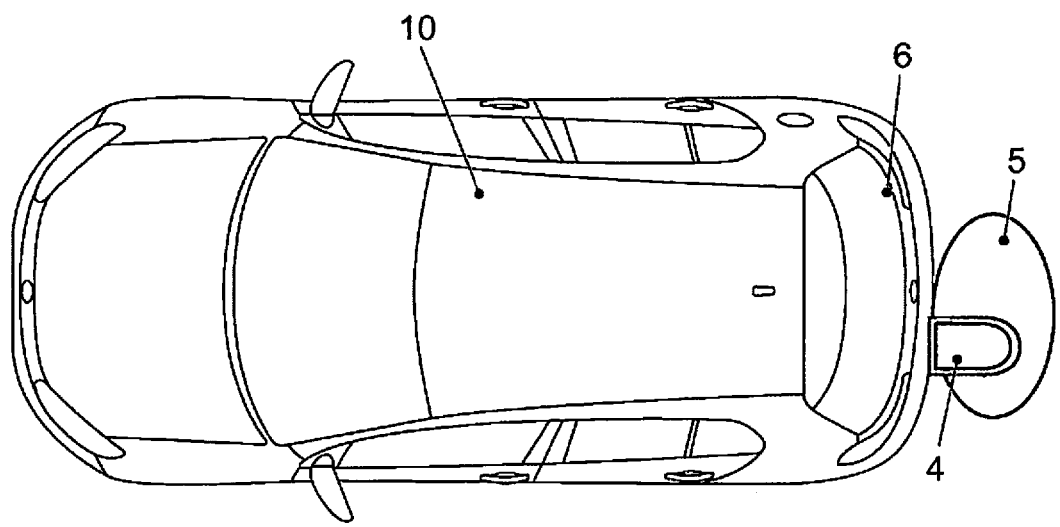
FIG. 1 shows a disclosed vehicle with the detection areas of an optical sensor and an ultrasound sensor.

DE 20 2010 017 197 U1 discloses the combination of a capacitive sensor, an optical sensor and an ultrasound sensor to actuate a closing element, wherein an ID transponder is simultaneously detected.

DE 10 2012 017 393 A1 describes the automatic actuation of a closing element of a motor vehicle. An optical sensor is triggered by a capacitive sensor.

DE 10 2009 023 594 A1 similarly describes the actuation of a closing element of a vehicle, wherein a capacitive and an optical sensor interact.

DE 10 2008 025 669 A1 discloses an apparatus for actuating a vehicle-closing device, wherein a high-frequency receiver is used as a first sensor and an optical sensor and/or an ultrasound sensor is/are used as a second sensor.

DE 10 2013 110 296 A1 describes a recording method for function actuations on vehicles.

The use of an ultrasound sensor in the contactless actuation of a closing element of the vehicle offers the benefit that an ultrasound sensor of this type is often already present as a parking aid. However, the ultrasound sensor has the drawback of a very high quiescent current consumption.

The disclosed embodiments implement the contactless actuation of a closing element using an ultrasound sensor, wherein the problem of the high quiescent current consumption is intended to be at least alleviated.

This is achieved by a method for actuating a closing element of a vehicle, by a device, and by a vehicle.

According to the disclosed embodiments, a method is provided for the automatic actuation (e.g., opening or closing) of a closing element of a vehicle, comprising the following operations:

Detecting a movement of an object using an optical sensor (e.g., a camera). Detecting the movement also comprises, in particular, detecting the object, which includes detecting the shape and size of the object.

Activating an ultrasound sensor depending on the detected movement. The ultrasound sensor is activated if the movement detected with the optical sensor satisfies a predefined movement condition.

Detecting a gesture using the ultrasound sensor. The gesture is detected with the ultrasound sensor and possibly also with the optical sensor. A part of the gesture may already be detected by the operation of detecting the movement of the object.

Automatically actuating a closing element depending on the detected gesture. The closing element is actuated if the detected gesture satisfies a predefined gesture condition.

A closing element is understood to mean a door, a tailgate, a window or a sliding roof of the vehicle.

Since the ultrasound sensor is activated to detect the gesture only if a type of precondition is first satisfied by the detection of the movement of the object with the optical sensor, the energy consumption of the ultrasound sensor can be drastically reduced compared with a method in which the ultrasound sensor must be constantly active to detect a gesture.

The ultrasound sensor is activated only if a person is detected with the optical sensor as the object and if the detected movement of the person additionally proceeds toward the detection area of the ultrasound sensor. If the optical sensor is a camera, the ultrasound sensor is activated according to this disclosed embodiment only if a person is detected, for example, on the basis of the shape and size in the image captured by the camera. In addition, the movement of this person is analyzed on the basis of an image sequence captured by the camera. The ultrasound sensor is activated only if the movement is directed toward the detection area of the ultrasound sensor and ends in the detection area of the ultrasound sensor.

The embodiment described above further limits the cases in which the ultrasound sensor is activated, so that the energy consumption of the ultrasound sensor can be further minimized.

If a person is detected as the object and if the movement of the person proceeds toward the detection area of the ultrasound sensor, a key authorized for the vehicle is searched for. The ultrasound sensor is activated only if the key authorized for the vehicle is successfully detected. The search for the key authorized for the vehicle is carried out using a radio signal transmitted by the vehicle, to which the authorized key in turn responds with a radio signal which is then evaluated by the vehicle. The key is searched for in the surrounding area of the vehicle in which the gesture to actuate the closing element is also to be performed. The search for the key can be carried out with one or with a plurality of antennas which are also used for a keyless entry system of the vehicle. However, not all antennas of this keyless entry system need to be present to carry out the disclosed method.

Activation of the ultrasound sensor by persons who have no authorization for the vehicle may be excluded through this further condition.

As already indicated above, the gesture can be detected on the basis of outputs of the ultrasound sensor and the optical sensor. A check can be carried out using the outputs of the optical sensor (for example, using an image of a camera) to determine whether an object (e.g., a hand or foot of the person) which is intended to perform the gesture has a predefined shape. The distance between this object and the vehicle over time can be determined on the basis of the outputs of the ultrasound sensor to thereby capture further features of the gesture to be detected. The closing element is actuated only if the detected object has the predefined shape (e.g., of a hand or foot) in the outputs of the optical sensor and if the distance detected by the ultrasound sensor over time simultaneously satisfies a predefined condition, so that, on the whole, the gesture detected by the optical sensor and by the ultrasound sensor satisfies the predefined condition.

Numerous gestures can be detected through the interaction of the optical sensor and the ultrasound sensor. One or more specific gestures can thereby be selected which is/are to be performed by the person (in particular, the driver) to actuate the closing element of the vehicle or, for example, one specific closing element of a plurality of closing elements. As a result, for example, a first closing element can also be actuated with a first gesture and a second closing element with a second gesture different from the first gesture. It is thus possible for there to be an opening gesture and a closing gesture differing therefrom for the same closing element.

For example, the gesture to be detected may be a straight kicking gesture or a standing gesture. The straight kicking gesture is understood to mean a kick performed with the foot, wherein the movement of the foot with this kick is directed essentially in the longitudinal direction of the vehicle. In the case of the standing gesture, the person remains for a predefined time period (e.g., for one or for two seconds) in the detection area of the ultrasound sensor without moving his feet. If the kicking gesture and/or the standing gesture is/are detected, the closing element is actuated (e.g., opened).

According to another example, the gesture to be detected may involve the object or person passing by the ultrasound sensor. The person passing by is understood to mean that the person is passing in the detection area of the ultrasound sensor, wherein the direction of passage is oriented essentially perpendicular to the longitudinal direction of the vehicle. If this passing by is detected, the closing element is actuated (e.g., a tailgate of the vehicle is closed).

In the opening and closing of tailgates and doors, a check is carried out with the ultrasound sensor and/or with the optical sensor before the opening and before the closing, to determine whether an obstacle or object is located in the movement path of the tailgate or the door. The closing element is actually actuated only if the ultrasound sensor and/or the optical sensor detects no obstacle or object in an area in which the closing element moves when actuated. The tailgate or the door is thereby prevented from hitting this obstacle or object when it is opened or closed.

The automatic opening of the closing element may comprise an unlocking of the closing element or of the entire vehicle. The closing of the closing element may similarly comprise a locking of the closing element or of the entire vehicle. However, it is also possible for the automatic closing of the closing element not to change the locking state of the closing element or of the vehicle or to restore the locking state which the closing element and/or the vehicle has/have before the automatic closing at the end of the closing procedure.

According to at least one disclosed embodiment, the already activated ultrasound sensor is deactivated if it is detected with the optical sensor that the detected object is leaving the detection area of the ultrasound sensor.

If it is recognized that the object is leaving the detection area of the ultrasound sensor, the gesture recognition using the ultrasound sensor can be interrupted. The ultrasound sensor can thereby be deactivated early before the ultrasound sensor itself recognizes, for example, after a predefined time period, that it will not detect the gesture necessary for the actuation of the closing element.

The already activated ultrasound sensor can similarly be deactivated if it is recognized by the optical sensor that the object or person is moving away from the detection area of the ultrasound sensor.

The closing element may be a completely actuatable closing element (i.e., a closing element that is to be automatically opened or closed, such as, e.g., an automatically movable trunk lid), or only a self-opening (but not self-closing) closing element, such as, e.g., a self-opening trunk lid. In this case (if the closing element is self-opening only), the actuation of the closing element involves an opening of the closing element.

In addition, the ultrasound sensor may form part of the parking aid of the vehicle.

In this case, the ultrasound sensor of the parking aid is used not only for the support of a parking maneuver, but additionally for the automatic actuation of the closing element.

A device for actuating a closing element of a vehicle is also provided. The device comprises control mechanisms, an optical sensor (e.g., a camera) and an ultrasound sensor. The optical sensor is designed to detect a movement of an object. The control mechanisms are designed to evaluate the movement detected by the optical sensor and to activate the ultrasound sensor depending on this evaluation. The ultrasound sensor is designed to detect a gesture. Finally, the control mechanisms are additionally designed to evaluate the gesture and to actuate the closing element of the vehicle depending on the gesture.

The benefits of the disclosed device essentially correspond to the benefits of the disclosed method, which are previously described in detail, so that a repetition can be dispensed with here.

The disclosed device is designed to activate the ultrasound sensor using the control mechanisms if a person is detected by the optical sensor as the object and if the movement of the person toward the detection area of the ultrasound sensor is detected by the optical sensor.

In addition, the device may be designed to detect the gesture not only on the basis of the outputs of the ultrasound sensor, but also on the basis of the outputs of the optical sensor.

Finally, a vehicle is provided which comprises a closing element and a device as previously described.

The actuation of a closing element can be intuitively controlled. After unloading the trunk, for example, it is no longer necessary to put down the load to initiate the closing of the tailgate or door.

The present disclosure is suitable for motor vehicles. The present disclosure is obviously not restricted to this field of application, since the present disclosure is also usable with ships, aircraft and track-bound or rail-borne vehicles. In addition, the present disclosure can also be used in principle to actuate closing elements of stationary objects (e.g., buildings).

FIG. 1 shows, schematically in a plan view, a vehicle 10 which has a tailgate 6 as a closing element. The vehicle 10 comprises a camera (not shown in FIG. 1) which has a camera detection area 5, and an ultrasound sensor (not shown in FIG. 1) which has an ultrasound detection area 4. It is evident that the camera detection area 5 is substantially larger than the ultrasound detection area 4 and completely encloses the latter. The camera is therefore able to detect a person substantially earlier than the ultrasound sensor. This is a prerequisite for being able to detect a movement of the person toward the ultrasound detection area 4.

Figure 2:
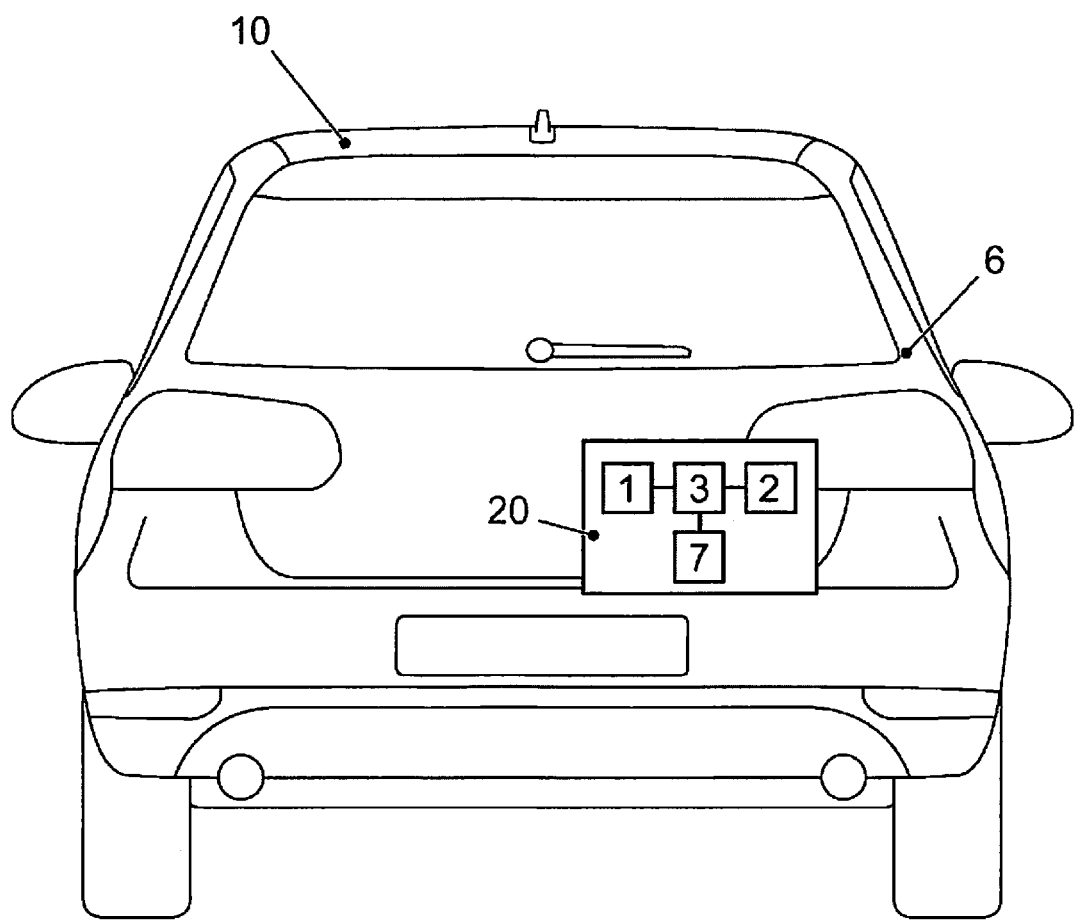
FIG. 2 shows schematically a disclosed vehicle with a disclosed device.

FIG. 2 shows schematically a vehicle 10 which comprises a tailgate 6 and device 20. The device 20 itself comprises a camera 1, an ultrasound sensor 2 and an antenna 7 as well as a controller 3.

Figure 3:
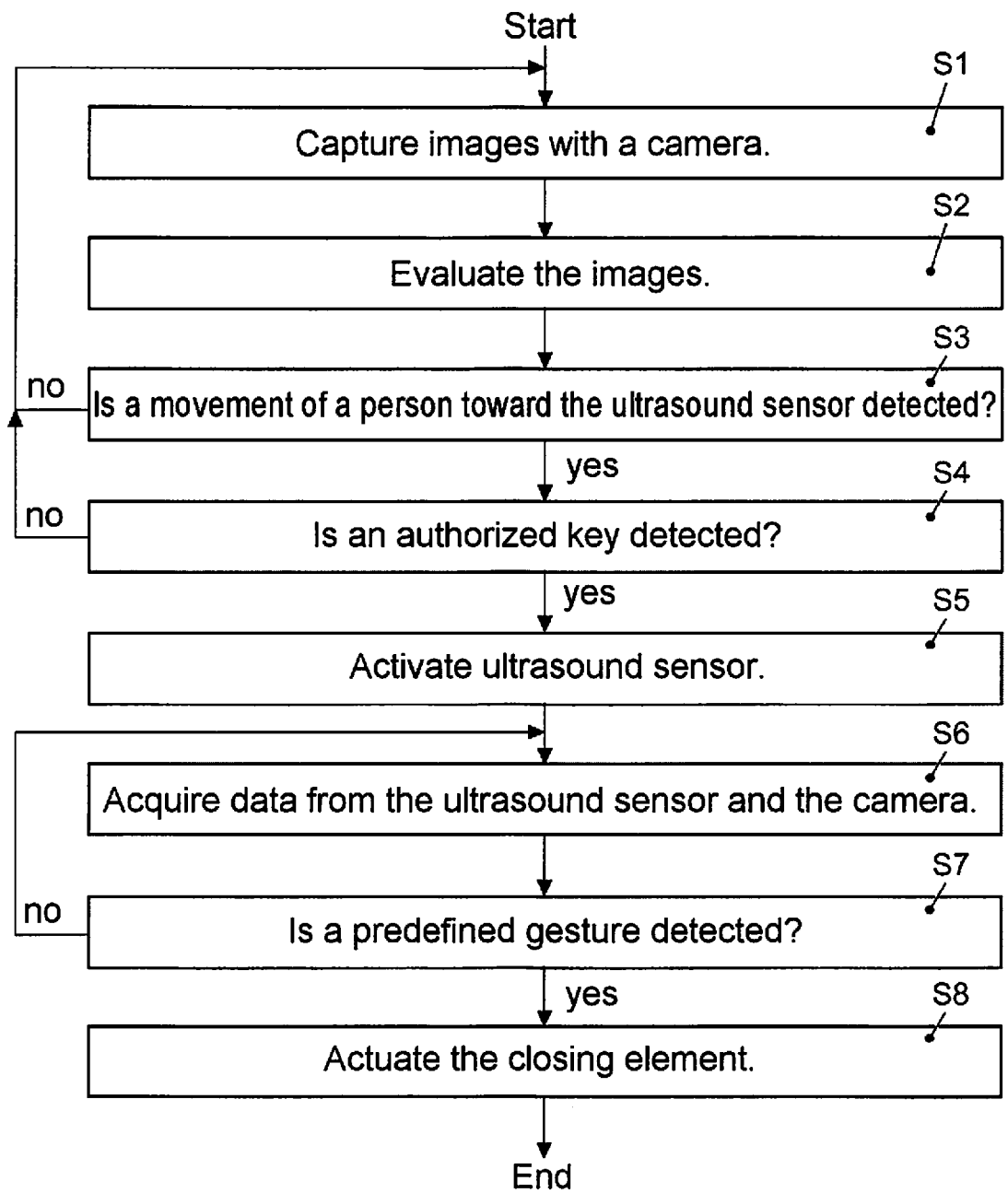
FIG. 3 shows the flow diagram of a disclosed method.

The mode of operation of the disclosed device 20 and therefore the disclosed vehicle 10 is described below with reference to FIG. 3 which shows the flow diagram of a disclosed method.

In operation at S1, images are captured in the rear area of the vehicle 10 with the camera 1, the images then being evaluated in operation at S2 by the controller 3. If a person is detected in the captured images and if a movement of this person toward the detection area 4 of the ultrasound sensor 2 is detected in the captured images, a radio key (not shown) authorized for the vehicle 10 is searched for. If the controller 3 recognizes through the evaluation of the radio signals detected by the antenna 7 from the radio key that the key has an authorization for the vehicle 10, the ultrasound sensor 2 is activated in operation at S5. Conversely, if no movement of a person toward the detection area 4 of the ultrasound sensor 2 is detected in operation at S3 or if no authorized key is detected in operation at S4, the method returns to operation at S1.

Using the ultrasound sensor 2 and the camera 1, data are acquired in operation at S6 to recognize a predefined gesture of the previously detected persons on the basis of these data which are evaluated with the controller 3. If the evaluation of the data in operation at S7 indicates that a predefined gesture has been detected, the tailgate 6 of the vehicle 10 is actuated as the closing element in the following operation at S8. Conversely, if the predefined gesture has not yet been detected in operation at S7, the method initially returns to operation at S6 to acquire further data with the ultrasound sensor 2 and the camera 1.

If the evaluation of the images of the camera in operation at S7 indicates that the person is leaving the detection area 4 of the ultrasound sensor 2, the ultrasound sensor 2 is deactivated and the method returns to operation at S1, in which only the camera 1 is active.

REFERENCE NUMBER LIST

1 Camera
2 Ultrasound sensor
3 Controller
4 Detection area of the ultrasound sensor
5 Detection area of the camera
6 Tailgate
7 Antenna
10 Vehicle
20 Device

The invention claimed is:

1. A method for actuating one or more closing elements of a vehicle, the method comprising:
   detecting an object in a detection area of an optical sensor using the optical sensor;
   detecting a movement of the object toward a detection area of an ultrasound sensor using the optical sensor, the detection area of the optical sensor being larger than the detection area of the ultrasound sensor, and the detection area of the optical sensor at least partially overlapping with the detection area of the ultrasound sensor;
   activating the ultrasound sensor in response to the detected movement toward the detection area of the ultrasound sensor by the optical sensor;
   detecting a gesture of the object in the detection area of the ultrasound sensor using the ultrasound sensor;
   detecting a predefined shape of the object which performs the gesture based on the outputs of the optical sensor; and
   detecting a distance between the object and the vehicle per time unit as the gesture based on the outputs of the ultrasound sensor,
   wherein the method further comprises:
   actuating a first closing element of the one or more closing elements in response to the object being the predefined shape and the detected gesture corresponding to a first predefined movement condition and actuating a second closing element of the one or more closing elements in response to the object being the predefined shape and the detected gesture corresponding to a second predefined movement condition different from the first predefined movement condition; or
   actuating a third closing element of the one or more closing elements to open in response to the object being the predefined shape and the detected gesture corresponding to a third predefined movement condition and actuating the third closing element of the one or more closing elements to close in response to the object being the predefined shape and the detected gesture corresponding to a fourth predefined movement condition different from the third predefined movement condition.

2. The method of claim 1, further comprising identifying the object as a person based on at least one of a size and shape of the object using the optical sensor, and detecting for movement of the object toward the ultrasound sensor in response to the object being identified as a person.

3. The method of claim 2, further comprising:
   searching for a key authorized for the vehicle in response to a person being detected as the object and the movement of the person is proceeding toward the detection area of the ultrasound sensor; and
   activating the ultrasound sensor in response to the key authorized for the vehicle being detected.

4. The method of claim 1, wherein at least one of the first, second, third, and fourth predefined movement conditions corresponds to a straight kicking gesture or a standing gesture.

5. The method of claim 1, wherein the fourth predefined movement condition corresponds to the object passing by the ultrasound sensor.

6. The method of claim 1, further comprising:
   deactivating the activated ultrasound sensor in response to the optical sensor detecting that the object is leaving the detection area of the ultrasound sensor.

7. The method of claim 1, wherein the third closing element is self-opening and the actuation of the third closing element includes an opening of the third closing element.

8. The method of claim 1, wherein the vehicle comprises a parking aid, and the parking aid comprises the ultrasound sensor.

9. The method of claim 1, further comprising:
   checking a movement path area of the one or more closing elements for obstacles using at least one of the optical sensor and the ultrasound sensor; and
   actuating the one or more closing elements in response to no obstacles being detected in the movement path area.

10. A device for actuating one or more closing elements of a vehicle, the device comprising:
- a controller;
- an optical sensor; and
- an ultrasound sensor,
- wherein the optical sensor is configured to detect an object in a detection area of the optical sensor and to detect a movement of the object toward a detection area of an ultrasound sensor, the detection area of the optical sensor being larger than the detection area of the ultrasound sensor, and the detection area of the optical sensor at least partially overlapping with the detection area of the ultrasound sensor,
- wherein the controller is configured to evaluate the movement detected by the optical sensor and to activate the ultrasound sensor in response to the detected movement being toward the detection area of the ultrasound sensor,
- wherein the ultrasound sensor is configured to detect a gesture of the object in the detection area of the ultrasound sensor,
- wherein the optical sensor is configured to detect a predefined shape of the object which performs the gesture, and
- wherein the controller is configured detect a distance between the object and the vehicle per time unit as the gesture based on the outputs of the ultrasound sensor, to evaluate the gesture, and to:
  - actuate a first closing element of the one or more closing elements in response to the object being the predefined shape and the detected gesture corresponding to a first predefined movement condition and actuate a second closing element of the one or more closing elements in response to the object being the predefined shape and the detected gesture corresponding to a second predefined movement condition different from the first predefined movement condition; or
  - actuate a third closing element of the one or more closing elements to open in response to the object being the predefined shape and the detected gesture corresponding to a third predefined movement condition and actuate the third closing element of the one or more closing elements to close in response to the object being the predefined shape and the detected gesture corresponding to a fourth predefined movement condition different from the third predefined movement condition.

11. The device of claim 10, wherein the controller is further configured to identify the object as a person based on at least one of a size and shape of the object using the optical sensor and the optical sensor is further configured to detect for movement of the object toward the ultrasound sensor in response to the object being identified as a person.

12. A vehicle with one or more closing elements and a device as claimed in claim 10.

13. The device of claim 11, wherein the controller is further configured to:
- search for a key authorized for the vehicle in response to a person being detected as the object and the movement of the person is proceeding toward the detection area of the ultrasound sensor; and
- activate the ultrasound sensor in response to the key authorized for the vehicle being detected.

14. The device of claim 10, wherein at least one of the first, second, third, and fourth predefined movement conditions corresponds to a straight kicking gesture or a standing gesture.

15. The device of claim 10, wherein the fourth predefined movement condition corresponds to the object passing by the ultrasound sensor.

16. The device of claim 10, wherein the controller is further configured to deactivate the activated ultrasound sensor in response to the optical sensor detecting that the object is leaving the detection area of the ultrasound sensor.

17. The device of claim 10, wherein the third closing element is self-opening and the actuation of the third closing element includes an opening of the third closing element.

18. The device of claim 10, wherein the vehicle comprises a parking aid, and the parking aid comprises the ultrasound sensor.

19. The device of claim 10, wherein at least one of the optical sensor and the ultrasound sensor is further configured to check a movement path area of the one or more closing elements for obstacles, and wherein the controller is further configured to actuate the one or more closing elements in response to no obstacles being detected in the movement path area.

* * * * *